US005651282A

United States Patent [19]
Fisher et al.

[11] Patent Number: 5,651,282
[45] Date of Patent: Jul. 29, 1997

[54] METHOD OF CONTROLLING A CRIMP PRESS FOR CRIMPING A HOSE ASSEMBLY

[75] Inventors: John Harry Fisher, Novi; Douglas Parks Shelly, Grass Lake, both of Mich.

[73] Assignee: Ford Motor Company, Dearborn, Mich.

[21] Appl. No.: 465,019

[22] Filed: Jun. 5, 1995

[51] Int. Cl.⁶ .................. B21J 9/12; H01R 43/04
[52] U.S. Cl. .............. 72/19.9; 72/21.5; 72/453.01; 29/863; 29/753
[58] Field of Search .................. 72/19.8, 19.9, 72/21.5, 30.1, 453.01, 389.3; 29/715, 863, 753

[56] References Cited

U.S. PATENT DOCUMENTS

| | | |
|---|---|---|
| 3,168,918 | 2/1965 | Smith ........................ 72/19.9 |
| 3,372,544 | 3/1968 | Kirkwood . |
| 3,662,450 | 5/1972 | Kish et al. . |
| 3,742,754 | 7/1973 | Jeromson, Jr. et al. . |
| 3,750,453 | 8/1973 | Dryden et al. . |
| 3,822,456 | 7/1974 | Petruzzi . |
| 4,116,122 | 9/1978 | Linder et al. .................. 72/453.01 |
| 4,476,677 | 10/1984 | Hanshaw . |
| 4,914,602 | 4/1990 | Abe et al. .................. 72/3 |
| 4,916,810 | 4/1990 | Yeomans .................. 29/863 |
| 5,031,431 | 7/1991 | Naito .................. 72/21.5 |
| 5,271,254 | 12/1993 | Gloe et al. .................. 29/715 |
| 5,526,669 | 6/1996 | Gjovik et al. .................. 72/19.9 |

Primary Examiner—David Jones
Attorney, Agent, or Firm—Raymond L. Coppiellie; Roger L. May

[57] ABSTRACT

A method of controlling a crimp press for crimping a hose assembly includes the steps of placing a hose assembly in an open crimp die of a crimp press, advancing a ram of the crimp press to a predetermined position to close the crimp die, determining whether a pressure in the ram is within a predetermined range, and alerting an operator if the pressure in the ram is not within the predetermined range.

20 Claims, 3 Drawing Sheets

METHOD OF CONTROLLING A CRIMP PRESS FOR CRIMPING A HOSE ASSEMBLY

BACKGROUND OF THE INVENTION

1. Field of the Invention

The present invention relates generally to crimp presses and, more specifically, to a method of controlling a crimp press for crimping a hose assembly.

2. Description of the Related Art

It is known to provide a crimp press for crimping a hose assembly. Typically, the crimp press has a bed ram, and crimp die. The ram of the crimp press is reciprocally movable towards the bed to drive the crimp die together to contact and crimp a sleeve of a fitting onto a hose to form the hose assembly.

It is also known to use aluminum tubing for fittings on an air conditioning system of a motor vehicle. Although the aluminum tubing has worked well, it may be collapsed during crimping in the crimp press. The collapsed tubing may result in a weakened fitting and restricted fluid flow therethrough. To prevent the aluminum tubing from collapsing, a steel insert is typically disposed inside of the aluminum tubing prior to crimping. The steel insert helps maintain the internal diameter of the aluminum tubing. However, this steel insert results in added cost in parts and labor for the hose assembly. As a result, there is a need in the art to control the crimp press for crimping a hose assembly to maintain the internal diameter of the tubing and eliminate the need for the steel insert.

SUMMARY OF THE INVENTION

Accordingly, the present invention is a method of controlling a crimp press for crimping a hose assembly. The method includes the steps of placing a hose assembly in an open crimp die of a crimp press, advancing a ram of the crimp press to a predetermined position to close the crimp die, determining whether the pressure in the ram is within a predetermined range, and alerting an operator if the pressure in the ram is not within the predetermined range.

One advantage of the present invention is that a method is provided of controlling a crimp press for crimping a hose assembly. Another advantage of the present invention is that the method provides predetermined controls and parameters for crimping aluminum tubing with the crimp press that resists collapsing of the aluminum tubing and eliminates the need for a steel insert. Yet another advantage of the present invention is that the method controls the linear motion and pressure of the ram of the crimp press with predetermined parameters rather than measuring the straining of rods. A further advantage of the present invention is that the method of crimping with predetermined controls and parameters allows an operator of the crimp press to know immediately if the crimp does not meet engineering specifications.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
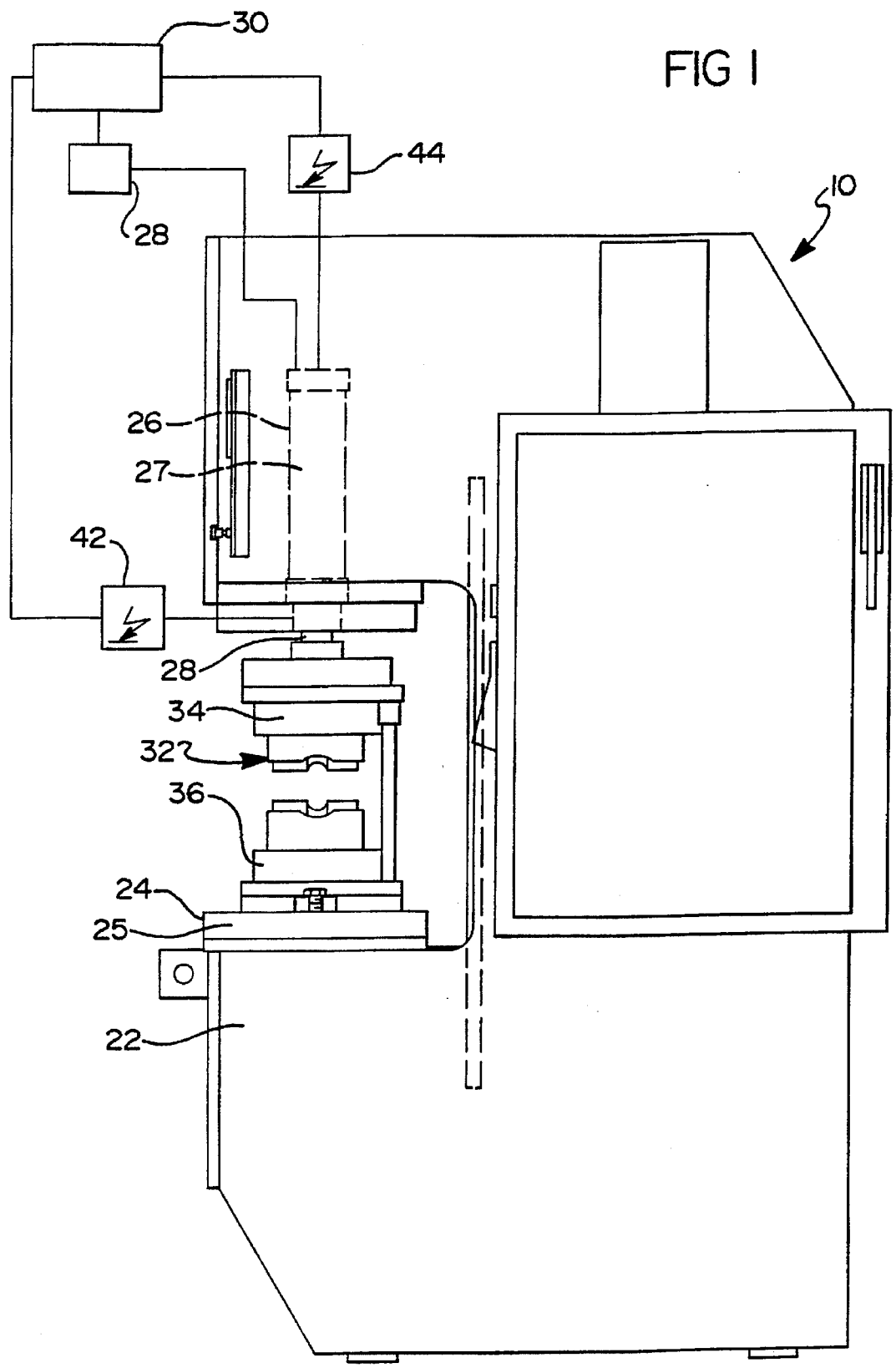
FIG. 1 is an elevational view of a crimp press.
Figure 2:
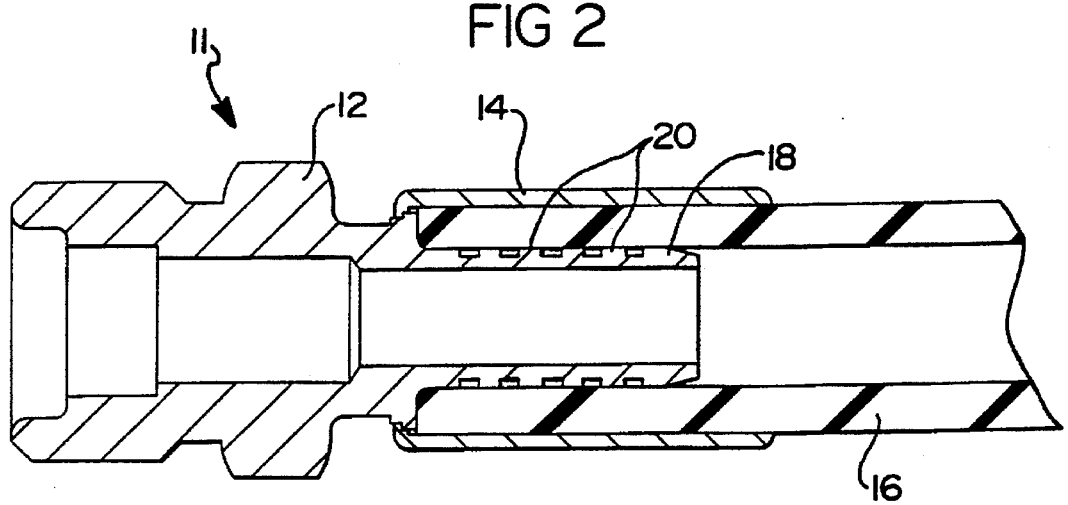
FIG. 2 is a fragmentary elevational view of a hose assembly prior to crimping in the crimp press of FIG. 1.

Referring to the drawings and in particular to FIGS. 1 and 2, one embodiment of a crimp press 10 is shown for crimping a hose assembly, generally indicated at 11. The hose assembly 11, in this example, is used on an air conditioning system (not shown) of a motor vehicle (not shown). The hose assembly 11 includes a couple or fitting 12, a ferrule or sleeve 14 and a hose 16. The fitting 12 is made of a metal material such as aluminum or steel tubing and has a generally cylindrical and axial projection 18. The projection 18 has at least one, preferably a plurality of barbs 20 spaced axially therealong. The sleeve 14 is also made of a metal material such as aluminum or steel and is generally cylindrical in shape. The sleeve 14 is secured to the fitting 12 by suitable means such as a bead lock to be radially spaced from and extended over the projection 18. The hose 16 is made of a flexible material such as an elastomer with a fiber core base. For example, the hose 16 may have a butyl cover over a braided fabric yarn over a nylon barrier as is known in the art. The hose 16 is disposed over the projection 18 and underneath the sleeve 14. It should be appreciated that the sleeve 14 is crimped to create an interference fit between the sleeve 14, hose 16 and projection 18. It should also be appreciated that the fitting 12 and hose 16 may be made of various suitable wall thickness and diameters.

The crimp press 10 includes a frame 22, bed 24 and ram 26. The bed 24 includes a bed plate 25 having a generally rectangular shape. The bed plate 25 is rigid and connected to the frame 22 by suitable means to form the bed 24 of the crimp press 10. The ram 26 includes a hydraulic cylinder 27 having a reciprocating piston (not shown) therein and a rod 28 connected to the piston. The hydraulic cylinder 27 is positioned above the bed plate 24 and connected to the frame 22 by suitable means to form the ram 26 of the crimp press 10. It should by appreciated that the ram 26 is operated by fluid pressure to be described.

The crimp press 10 also includes a hydraulic fluid system 28 fluidly connected to the ram 26. The hydraulic fluid system 28 includes a motor, pump, fluid reservoir, fluid cooler, and a plurality of solenoid-actuated valves (not shown) for controlling the fluid flow and pressure to the ram 26. The crimp press 10 includes an electronic control system 30 electronically connected to the motor of the pump and the solenoids of the solenoid-actuated valves. The electronic control system includes a controller, remote keypad and read-out (not shown). The electronic control system 30 and hydraulic fluid system 28 control the fluid pressure to the ram 26. For example, the fluid pressure to the ram 26 may be controlled to provide a rapid advance of approximately 212 inches per minute (I.P.M.) and a pressing advance of 79 I.P.M. and a return stroke of 350 I.P.M. Such a crimp press 10 is commercially available as a 20 ton "C" frame gap press from DAKE of Grand Haven, Mich.

Figure 3:
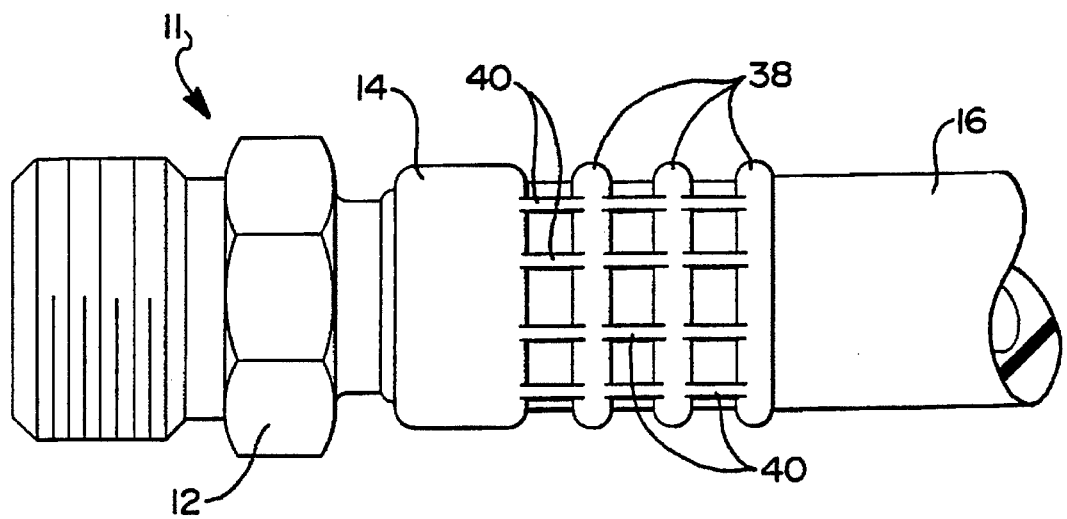
FIG. 3 is an elevational view of the hose assembly after crimping in the crimp press of FIG. 1.

The crimp press 10 also includes a crimp die, generally indicated at 32, for crimping the hose assembly 11. The crimp die 32 includes an upper die 34 connected to one end of the rod 28 and a lower die 36 connected to the bed plate 25. Such a crimp die is commercially available as a "S-1087" from LOMAR of Horton, Mich. When the crimp die 32 is open, the hose assembly 11 is placed in the lower die 36. The upper die 34 is moved by the ram 26 toward the lower die 36 to close the crimp die 32 and crimp the hose assembly 11 together as illustrated in FIG. 3. The crimp die 32 forms a crimp having a plurality of bubbles 38 and flats 40. It should be appreciated that the crimp die 32 may have any suitable type of crimp for crimping the hose assembly 11. It should also be appreciated that up to this point in the description, the crimp press 10 is conventional and known in the art.

The crimp press 10 further includes a pressure sensor or transducer 42 connected to the ram 26 and the electronic control system 30. The pressure transducer 32 senses or measures the fluid pressure in the ram 26 and sends a corresponding signal to the electronic control system 30. Such a pressure transducer 42 is commercially available from Dynisco of Sharon, Mass. The crimp press 10 also includes a linear sensor or transducer 44 connected to the ram 26 and the electronic control system 30. The linear transducer 34 senses or measures the linear distance of the ram 26 and sends a corresponding signal to the electronic control system 30. Such a linear transducer 34 is commercially available from Templesonics of Triangle Park, N.C. It should be appreciated that the pressure transducer 42 monitors the fluid pressure of the ram 26 and that the linear transducer 44 monitors the linear movement of the piston of the ram 26.

Figure 4:
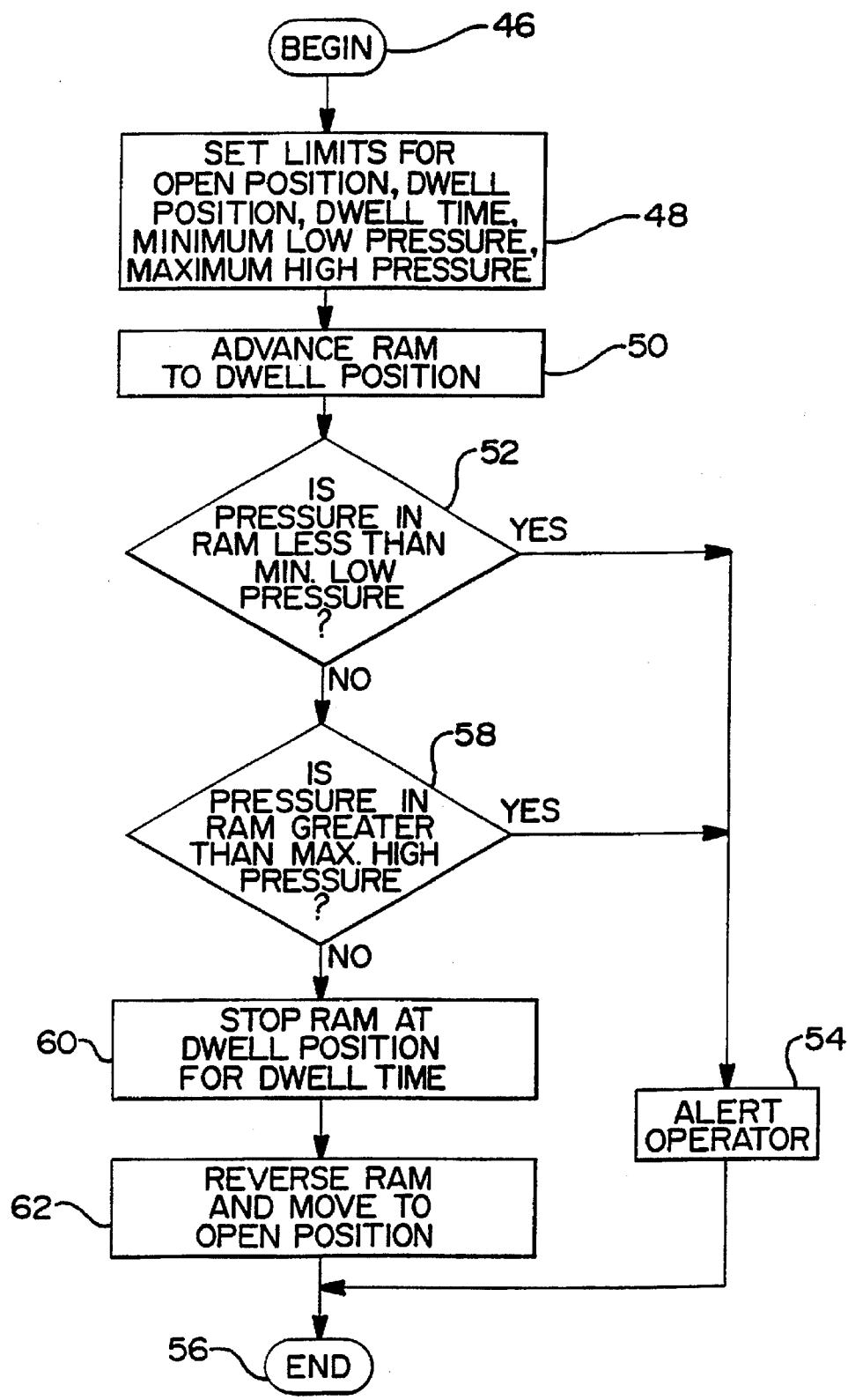
FIG. 4 is a flowchart of a method of controlling a crimp press for crimping a hose assembly according to the present invention.

Referring to FIG. 4, one embodiment of a method of controlling the crimp press 10 for crimping the hose assembly 11, according to the present invention, is shown. The method begins in bubble 46 and advances to block 48. In block 48, the method includes the step of setting predetermined limits for an open position for when the piston of the ram 26 is retracted away from the bed 24, a dwell position for when the piston of the ram 26 is advanced toward the bed 24, a dwell time for dwelling at the dwell position, a minimum or low fluid pressure of the ram 26 and a maximum or high fluid pressure of the ram 26. The hose assembly 11 is placed in the lower die 36 of the open crimp die 32 of the crimp press 10. It should be appreciated that the positions are in inches, time in seconds and pressure in pounds per square inch and that suitable metric equivalents may be used. It should also be appreciated that the predetermined limits are programmed into the electronic control system 30 by an operator via the remote keypad and readout.

From block 48, the method advances to block 50 and includes the step of advancing the ram 26 from the open position toward the predetermined dwell position to close the crimp die 32. With the crimp press 10 in an idle state to be described, the electronic control system 30 energizes various solenoids of the solenoid-actuated valves to direct delivery of hydraulic fluid from the pump to a head end of the hydraulic cylinder 27 to advance the rod 28 of the ram 26 at a rapid speed such as 212 I.P.M. followed by a pressing speed such as 79 I.P.M.

From block 50, the method determines whether the pressure in the ram 26 is within a predetermined pressure range. The method advances to diamond 52 and includes the step of determining whether the pressure in the ram 26 is less than a minimum or low fluid pressure such as 1000 psi. The pressure transducer 42 sends a signal of the fluid pressure in the ram 26 to the electronic control system 30. If so, the method advances to block 54 and includes the step of alerting the operator of the crimp press 10. The electronic control system 30 alerts the operator by illuminating an indicating light and sounding an audible alarm (not shown). From block 54, the method advances to bubble 56 and ends.

In diamond 52, if the pressure in the ram 26 is not less than the minimum or low fluid pressure, the method advances to diamond 58 and includes the step of determining whether pressure in the ram 26 is greater then the maximum or high fluid pressure such as 1875 psi. Preferably, the maximum or high fluid pressure is the same as the pressure for the hydraulic fluid system 28. If so, the method advances to block 54 previously described. If not, the method advances to block 60 and includes the step of stopping the ram 26 at the predetermined dwell position and dwelling or delaying for the predetermined dwell time such as 2 seconds. After block 60, the method advances to block 62 and includes the step of reversing the ram 26 and moving the ram 26 to the open position to open the crimp die 32. The electronic control system 30 de-energizes the previously energized solenoids and energizes various solenoids of the solenoid-actuated valves to direct delivery of hydraulic fluid to a rod end of the hydraulic cylinder 27 to retract the ram 26 at a fast speed. The linear transducer 44 sends a signal of the open distance to the electronic control system 30 to alert the operator. The electronic control system 30 de-energizes the solenoids previously energized and the ram 26 stops. The crimp press 10 reverts to an idle state with the pump motor running and delivery of fluid from the pump returns through the fluid cooler to the fluid reservoir. After block 62, the method advances to bubble 56 and ends. It should be appreciated that the method is repeated for each hose assembly 11 to be crimped.

Accordingly, the method of the present invention allows the operator to verify that every hose assembly 11 meets the predetermined criteria for the crimp. For example, if the pressure in the ram 26 is outside the fluid pressure range such as 1500 psi±5 psi as indicated by the pressure transducer 42, the operator is alerted to reject the hose assembly 11. If the pressure in the ram 26 is within the fluid pressure range but the linear movement of the ram 26 is less or more than a predetermined range such as twelve inches±0.002 inches as indicated by the linear transducer 44, the operator is alerted to reject the hose assembly 11.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of controlling a crimp press for crimping a hose assembly, said method comprising the steps of:

placing a hose assembly in an open crimp die of a crimp press;

advancing a ram of the crimp press to a predetermined position to close the crimp die;

determining whether a pressure in the ram is within a predetermined pressure range; and alerting an operator if the pressure in the ram is not within the predetermined pressure range.

2. A method as set forth in claim 1 including the step of stopping the ram at the predetermined position if the pressure in the ram is within the predetermined pressure range.

3. A method as set forth in claim 2 including the step of delaying for a predetermined time at the predetermined position.

4. A method as set forth in claim 3 including the step of reversing and moving the ram to open the crimp die.

5. A method set forth in claim 1 wherein said step of placing comprises placing a hose between a projection and sleeve of a fitting and placing the hose and fitting into a lower die of an open crimp die secured to a bed plate of the crimp press.

6. A method as set forth in claim 5 wherein said step of advancing comprises moving a ram with an upper die of the crimp die toward the lower die of the crimp die to a dwell position to close the crimp die.

7. A method as set forth in claim 1 wherein said step of determining comprises determining whether the pressure in the ram is less than a minimum fluid pressure and determining whether the pressure in the ram is greater than a maximum fluid pressure.

8. A method as set forth in claim 1 wherein said step of alerting comprises alerting an operator by illuminating an indicating light and sounding an audible alarm.

9. A method as set forth in claim 7 including the step of setting predetermined limits for the minimum fluid pressure and maximum fluid pressure.

10. A method of controlling a crimp press for crimping a hose assembly, said method comprising the steps of:

placing a hose assembly in an open crimp die of a crimp press;

advancing a ram of the crimp press to a predetermined position to close the crimp die;

determining whether a fluid pressure in the ram is less than a minimum fluid pressure and determining whether the fluid pressure in the ram is greater than a maximum fluid pressure;

alerting an operator if the pressure in the ram is less than the minimum fluid pressure or greater than the maximum fluid pressure; and stopping the ram at the predetermined position if the fluid pressure in the ram is not greater than the maximum fluid pressure.

11. A method as set forth in claim 10 including the step of delaying for a predetermined time at the predetermined position.

12. A method as set forth in claim 11 including the step of reversing and moving the ram to open the crimp die.

13. A method set forth in claim 10 wherein said step of placing comprises placing a hose between a projection and sleeve of a fitting and placing the hose and fitting into a lower die of an open crimp die secured to a bed of the crimp press.

14. A method as set forth in claim 13 wherein said step of advancing comprises moving a ram with an upper die of the crimp die toward the lower die of the crimp die to a dwell position to close the crimp die.

15. A method as set forth in claim 10 wherein said step of alerting comprises alerting an operator by illuminating an indicating light and sounding an audible alarm.

16. A method as set forth in claim 10 including the step of setting predetermined limits for the minimum fluid pressure and maximum fluid pressure.

17. A method of controlling a crimp press for crimping a hose assembly, said method comprising the steps of:

setting predetermined limits for a minimum fluid pressure and a maximum fluid pressure of a ram of a crimp press;

placing a hose assembly in an open crimp die of the crimp press;

advancing the ram of the crimp press to a predetermined position to close the crimp die;

determining whether the fluid pressure in the ram is less than the minimum fluid pressure and determining whether the pressure in the ram is greater than the maximum fluid pressure;

alerting an operator if the pressure in the ram is less than the minimum fluid pressure and greater than the maximum fluid pressure;

stopping the ram at the predetermined position if the fluid pressure in the ram is not greater than the maximum fluid pressure;

delaying for a predetermined time at the predetermined position; and reversing and moving the ram to open the crimp die.

18. A method set forth in claim 17 wherein said step of placing comprises placing a hose between a projection and sleeve of a fitting and placing the hose and fitting into a lower half of an open crimp die secured to a bed of the crimp press.

19. A method as set forth in claim 18 wherein said step of advancing comprises moving the ram with an upper die of the crimp die toward a lower die of the crimp die to a dwell position to close the crimp die.

20. A method as set forth in claim 17 wherein said step of alerting comprises alerting an operator by illuminating an indicating light and sounding an audible alarm.

* * * * *